United States Patent Office 3,110,696
Patented Nov. 12, 1963

3,110,696
POLYOLEFIN COMPOSITIONS STABILIZED AGAINST DETERIORATION AND COPPER WIRES COATED WITH SAID COMPOSITIONS
Martin Dexter, Briarcliff Manor, N.Y., assignor to Geigy Chemical Corporation, Greenburgh, N.Y., a corporation of Delaware
No Drawing. Filed Feb. 28, 1962, Ser. No. 176,451
15 Claims. (Cl. 260—45.8)

The present invention relates to polyolefin compositions suitable for insulation of copper wires and to the polyolefin compositions stabilized against degradation, especially degradation caused by the presence of copper. In particular, the invention relates to polypropylene compositions stabilized against degradation in presence of copper.

Polypropylene is an excellent insulating material for the wire coating on copper wires, since, in its solid state it has electrical and physical properties, as well as processing characteristics which make it eminently suitably for use as a wire coating material. Despite the outstanding properties of solid polypropylene for use in the coating of copper wire, however, it is necessary to add certain materials to the raw, unstabilized polypropylene, before the same can usefully be employed for the coating of copper wires.

Within the broad scope of the invention are compounds of the formula

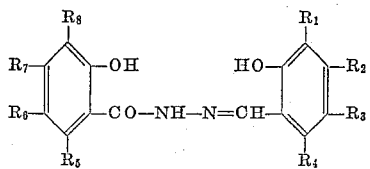

wherein $R_1$, $R_2$, $R_3$, $R_4$, $R_5$, $R_6$, $R_7$ and $R_8$ are each independently hydrogen, alkyl-, especially lower alkyl, e.g., methyl, ethyl, propyl, butyl, pentyl, hexyl-, alkoxy-, especially lower alkoxy, e.g. methoxy, ethoxy, propoxy, butoxy, pentoxy, hexoxy-, or a phenyl group, which are valuable stabilizers for polypropylene when used as an insulating material for covering copper wire or for any other use which requires prolonged contact of polypropylene with metallic copper under varied conditions of temperature, pressure, light ,etc.

The preferred stabilizer of the Formula I is N-salicylidene-N'-salicylhydrazide of the Formula II:

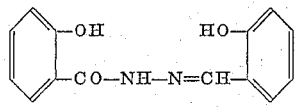

In the foregoing Formula I, compounds are preferred wherein the R substituents are relatively simple, for example: lower alkyl, lower alkoxy. The R groups may also be halogen e.g., fluorine, chlorine, etc. Where large, bulky substituents such as tertiary alkyl groups occur, it is preferred not to have the same on adjacent carbon atoms of the aromatic ring. The R groups in compounds of the Formula I may be either primary, secondary or tertiary alkyl or alkoxy groups, such as propyl, isopropyl, propoxy, isopropoxy, butyl, isobutyl, tert. butyl, butoxy, isobutoxy, tert. butoxy, etc.

The compounds of the Formula I, at least in part, are known. For example, the compound of the Formula II is a known compound and is prepared according to known methods as follows:

PREPARATION OF N-SALICYLIDENE-N'-SALICYLHYDRAZIDE (A) *Preparation of Salicylhydrazide.*—152.1 grams of methyl salicylate (M.W. 152.1; 1.0 mole) and 50 g. of hydrazine hydrate (M.W. 50; 1.0 mole) are placed in a round bottom flask fitted with a condenser and 100 ml. of ethanol are added. This solution is refluxed for 2½ hours, then set aside to cool slowly, whereupon the product, salicylhydrazide, crystallizes out of solution and the reaction mixture is placed in the refrigerator for a short time before filtering off the solid which is washed with cold ethanol and then dried in vacuo over $P_2O_5$.

The yield of salicylhydrazide is 71% of theory and its melting point is 146-148° C. This product is used as such for part (B) as follows:

(B) *Preparation of N-Salicylidene-N'-Salicylhydrazide.*—Salicylhydrazide (101.4 g.; N.W. 152.1, 0.67 mole) and 1000 ml. of ethanol are placed in a three neck flask fitted with dropping funnel, stirrer, condenser and thermometer. The mixture is heated to 65-70° C. and 85.5 g. of salicylaldehyde (M.W. 122.1; 0.7 mole) are added dropwise during one hour. After addition is complete the reaction mixture is refluxed for an additional hour. The product, N-salicylidene-N'-salicylhydrazide, precipitates during the addition and is filtered while the reaction mixture is hot. Then, the filter cake is washed with ethanol, after which the solid N-salicylidene-N'-salicylhydrazide is dried in vacuo over $P_2O_5$ to yield 163.3 g. (96% of theory) of product which melts at 281-283° C.

The object of the present invention is to provide compositions of matter containing polymerized unsaturated monomers, such as propylene or ethylene, but preferably propylene, so that the resulting polymers are stable against degradation which occurs in contact with metallic copper.

Other polymeric materials contemplated for stabilization when in contact with copper are: polymers and copolymers, both natural and synthetic, e.g. copolymers containing styrene, and/or acrylonitrile, and/or butadiene, etc. Thus, it is an object of the present invention to provide copper electrical members having a solid coating thereon, the coating comprising a solid polymer of propylene or ethylene, said polymer stabilized with a compound of the Formula I, preferably the compound of the Formula II, i.e., N-salicylidene-N'-salicylhydrazide. Other and further objects of the invention will in part be obvious and in part will appear hereinafter.

The foregoing objects are attained by the method which comprises incorporating a quantity of a compound of the Formula I, preferably of the Formula II, into a polypropylene or polyethylene composition suitable for covering copper wire as an insulator thereof, said quantity of stabilizing compounds of the Formula I, or preferably of the Formula II, being employed in an amount sufficient to prevent deterioration, especially deterioration due to oxidative degradation in presence of copper. Preferred quantities of stabilizer of the Formula I, or II, are in the range of from 0.001% to 1% by weight based on the weight of the polymer composition to be stabilized.

The use of stabilizers of the Formula I or II in polyolefins, especially in polypropylene compositions in contact with copper, is novel. Due to the nature of the polypropylene polymer, or of the polyethylene polymer, it could not be predicted that such a stabilizer of the Formula I, or II, would be compatible with the polymer in contact with copper or would be surprisingly effective as a stabilizer in a solid medium.

Moreover, it is customary to employ various other additives and stabilizers to polyolefin compositions used for coating purposes on copper wire. Again, the effect and compatibility of the compounds of Formula I, or II, could not be predicted with respect to the various stabilizers employed. It has been found, surprisingly, that the compounds of the Formula I, or II, manifest superior stabilizing effect, as well as compatibility, when used for suppressing the degradative effect of copper upon the polymeric coating material in contact with the metallic copper.

In general, thermal, light, and oxidation stabilizers, as well as fillers, chelating agents, coloring agents, pigments, and the like, are used in combination with the stabilizers of the Formula I, or II, for preparing polypropylene or polyethylene compositions suitable and useful in the insulating of copper wire as well as in the covering of copper metal for other purposes.

In order to indicate more fully the advantages of the present invention, the following examples are set forth, but it is not the intention to limit the scope of the invention thereto. In said examples, unless otherwise indicated, parts are by weight and the relationship between parts by weight and parts by volume is as that of grams to cubic centimeters. Temperature is expressed in degrees centigrade.

EXAMPLE I.—STABILIZATION OF POLYPROPYLENE 50 parts of polypropylene unstabilized resin (Hercules, PROFAX 6501), 0.5% by weight (based on unstabilized resin) of N-salicylidene-N'-salicylhydrazide, of the Formula II hereinabove, 0.5% by weight (based on the unstabilized resin) of 6-(3,5-di-t-butyl-4-hydroxyanilino)-2,4-bis(n-octylthio)-1,3,5-triazine, are thoroughly blended and then fluxed on a two-roll mill at 182° for 2 minutes. Copper dust (0.75 part, 1.5% by weight, on the unstabilized resin; purified, electrolytically) is milled into the fluxed resin material on the mill at 182° for 3 minutes. Thereafter, the so-obtained mixture is sheeted from the mill, allowed to cool, cut in small pieces and pressed on a hydraulic press to a thickness of 25 mil. The hydraulic press operation is carried out by pressing at 185° for 1 minute at contact pressure, and at 185° for 2 minutes at 175 lbs./sq. in. pressure, and then cooled at the same pressure.

The cooled, pressed specimens are cut into ½ inch by 1 inch by 25 mil pieces and these are tested for aging in a forced draft oven at 149°. The specimens are visually examined at periodic intervals for signs of deterioration, i.e. embrittlement, surface crazing, etc.

The so-stabilized resin remains free from deterioration for more than 200 hours. The unstabilized resin alone deteriorates after 3 hours, but when 1.5% of copper dust is attempted to be milled into the unstabilized resin, extensive deterioration takes place and prevents further milling.

Table I illustrates the stability of other polypropylene compositions tested in like fashion but with a different auxiliary stabilizer; in each case, N-salicylidene-N'-salicylhydrazide is used.

Table I

STABILIZATION OF POLYPROPYLENE CONTACTING COPPER

| Auxiliary Stabilizer Compound, 0.5% by weight in polypropylene stabilized with 0.5% by weight of N-salicylidene-N'-salicylhydrazide | Oven Aging, Hours of Stabilization |
|---|---|
| [4,4'-butylidene-bis(6-tert-butyl-m-cresol)] | 118 |
| n-Octadecyl-3,5-di-t-butyl-4-hydroxyphenylacetate | 236 |
| N-Octadecyl-(3,5-di-t-butyl-4-hydroxyphenylacetamide) | 325 |
| 2,4-bis(n-Octylthio)-6-(4-hydroxy-3,5-di-tertiary butyl-anilino)-1,3,5-triazine | 244 |
| Dilauryl-thio-dipropionate | 120 |
| Di-n-octadecyl-3,5-di-t-butyl-4-hydroxybenzyl-phosphonate | 325 |
| 2-(3,5-Di-t-butyl-4-hydroxyanilino)-4,6-bis(n-octylthioethylthio)-1,3,5-triazine | 310 |
| 2,4-bis(4-Hydroxy-3,5-di-t-butylphenoxy)-6-(n-octylthio)-1,3,5-triazine | 300 |
| 2,4-bis(n-Octylthio)-6-(4-hydroxy-3,5-di-t-butyl-phenoxy) 1,3,5-triazine | 130 |
| 2,4-bis(n-Octylthioethylthio)-6-(4-hydroxy-3,5-di-t-butyl-phenoxy)-1,3,5-triazine | 183 |
| Blank (Polypropylene and Copper alone) | 0 |

When the auxiliary stabilizers above (Example I, Table I) are used without N-salicylidene-N'-salicylhydrazide, they are substantially ineffective in stabilizing polypropylene in presence of copper against deterioration in the oven aging test under the conditions described in Example I.

EXAMPLE II.—STABILIZED INSULATION FOR COPPER WIRE

Stabilized polypropylene prepared according to Example I is fed into an extruder which is equipped with an extrusion head suitable for covering copper wire of ¹⁄₃₂ inch outside diameter. The coated wire having about ¹⁄₃₂ inch thick stabilized polypropylene coating is suitable for use as an insulated electrical wire. The insulating covering of polypropylene has good dielectric properties and excellent stability.

"Foamed polypropylene" may also be used conveniently for insulation of copper wire. It is understood that any convenient "blowing agent" may be used to create a polypropylene covering having a foam-like structure. The "blowing agent" is preferably such, that it is activated by heat.

In the foregoing examples it is seen how the N-salicylidene-N'-salicylhydrazide compound of the Formula II is especially useful in compositions of polypropylene stabilized with auxiliary antioxidants and thermal stabilizers. The invention embraces not merely the specific auxiliary stabilizer compounds illustrated above, but extends to all suitable stabilizers which have the requisite compatibility and stabilizing properties for polypropylene, as is known and disclosed in the art. The auxiliary stabilizer, therefore, should contain sufficient stabilizing functional groups to protect the polypropylene composition against thermal and oxidative deterioration. Groups such as the phenolic residue, divalent sulphur, aromatic amino residues, etc. may be usefully employed in such auxiliary stabilizers. Sulphur containing esters such as dilauryl-thio-dipropionate may also be usefully employed alone, or in combination with other phenolic stabilizer compounds as mentioned.

The invention extends to stabilization of polyethylene as well as polypropylene when used in contact with copper, for example, for insulating material in copper wire. All of the aforesaid stabilizers having phenolic residues therein are usefully employed in the stabilization of polyethylene in combination with the compounds of Formula I and especially of N-salicylidene-N'-salicylhydrazide of Formula II.

What is claimed is:
1. Composition of matter comprising a normally solid polyolefin selected from the group consisting of polyeth- ylene and polypropylene, and a stabilizing amount of a compound of the formula

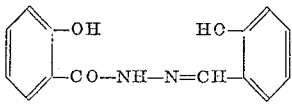

2. Composition of matter comprising normally solid polypropylene, and a stabilizing amount of the compound of the formula:

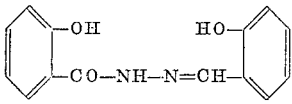

3. Composition according to claim 2 wherein said composition also contains a stabilizing amount of 2,4-bis(n-octylthio)-6-(4-hydroxy-3,5-di-tert. butylanilino)-1,3,5-triazine.

4. Composition according to claim 2 wherein said composition also contains a stabilizing amount of [4,4'-butylidene-bis(6-tert. butyl-m-cresol)].

5. Composition according to claim 2 wherein said composition also contains a stabilizing amount of n-octadecyl-3,5-di-t-butyl-4-hydroxyphenylacetate.

6. Composition according to claim 2 wherein said composition also contains a stabilizing amount of N-octadecyl-(3,5-di-t-butyl-4-hydroxyphenylacetamide).

7. Composition according to claim 2 wherein said composition also contains a stabilizing amount of dilauryl-thio-dipropionate.

8. Composition according to claim 2 wherein said composition also contains a stabilizing amount of di-n-octadecyl-3,5-di-t-butyl-4-hydroxybenzylphosphonate.

9. Composition according to claim 2 wherein said composition also contains a stabilizing amount of 2-(3,5-di-t-butyl-4-hydroxyanilino) - 4,6 - bis(n-octylthioethylthio)-1,3,5-triazine.

10. Composition according to claim 2 wherein said composition also contains a stabilizing amount of 2,4-bis-(4-hydroxy - 3,5 - di-t-butylphenoxy)-6-(n-octylthio)-1,3,5-triazine.

11. Composition according to claim 2 wherein said composition also contains a stabilizing amount of 2,4-bis-(n-octylthio) - 6 - (4-hydroxy-3,5-di-t-butylphenoxy)-1,3,5-triazine.

12. Composition according to claim 2 wherein said composition also contains a stabilizing amount of 2,4-bis-(n-octylthioethylthio) - 6 - (4-hydroxy - 3,5 - di-t-butylphenoxy)-1,3,5-triazine.

13. An electrical member comprising a copper electrical conductor having solid insulation in direct contact therewith, said solid insulation comprising a normally solid polyolefin selected from the group consisting of polyethylene and polypropylene and a stabilizing amount of the compound of the formula:

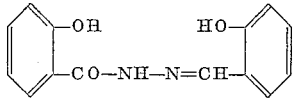

14. An electrical member comprising a copper electrical conductor having solid insulation in direct contact therewith, said solid insulation comprising polypropylene and a stabilizing amount of the compound of the formula:

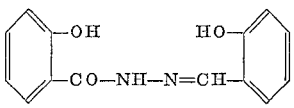

15. An electrical member according to claim 14, wherein the solid insulation also contains an auxiliary stabilizer selected from the group consisting of 2,4-bis(n-octylthio)-6-(4-hydroxy-3,5-di-t-butylanilino)-1,3,5-triazine;
4,4'-butylidene-bis(6-t-butyl-m-cresol);
n-octadecyl-3,5-di-t-butyl-4-hydroxy-phenylacetate;
N-octadecyl-(3,5-di-t-butyl-4-hydroxy-phenylacetamide;
dilauryl-thio-dipropionate;
di-n-octadecyl-3,5-di-t-butyl-4-hydroxy-benzylphosphonate;
2-(3,5-di-t-butyl-4-hydroxy-anilino)-4,6-bis(n-octylthioethyl-thio)-1,3,5-triazine;
2,4-bis(4-hydroxy-3,5-di-t-butylphenoxy)-6-(n-octylthio)-1,3,5-triazine;
2,4-bis(n-octylthio)-6-(4-hydroxy-3,5-di-t-butylphenoxy)-1,3,5-triazine;
2,4-bis(n-octylthio-ethylthio)-6-(4-hydroxy-3,5-di-t-butyl-phenoxy)-1,3,5-triazine.

No references cited.